United States Patent
Roche et al.

[11] Patent Number: 6,009,859
[45] Date of Patent: Jan. 4, 2000

[54] LIQUID-COOLED IN-LINE FUEL PUMP

[75] Inventors: Ronald H. Roche; Mark S. Swanson, both of Cass City, Mich.

[73] Assignee: Walbro Corporation, Cass City, Mich.

[21] Appl. No.: 08/986,957

[22] Filed: Dec. 8, 1997

[51] Int. Cl.[7] .................................................. F02M 37/04
[52] U.S. Cl. ........................ 123/509; 123/541; 123/41.31
[58] Field of Search ................................... 123/541, 516, 123/41.31, 514, 509, 497

[56] References Cited

U.S. PATENT DOCUMENTS

| | | | |
|---|---|---|---|
| 4,084,564 | 4/1978 | Rickert | 123/541 |
| 4,364,355 | 12/1982 | Karino | 123/541 |
| 5,039,284 | 8/1991 | Talaski | 123/516 |
| 5,265,997 | 11/1993 | Tuckey | 415/55.1 |
| 5,309,885 | 5/1994 | Rawlings et al. | 123/509 |
| 5,392,750 | 2/1995 | Laue | 123/509 |
| 5,579,739 | 12/1996 | Tuckey et al. | 123/467 |
| 5,586,858 | 12/1996 | Tuckey | 415/55.1 |
| 5,598,827 | 2/1997 | Kato | 123/516 |
| 5,642,719 | 7/1997 | Brown | 123/509 |
| 5,647,331 | 7/1997 | Swanson | 123/509 |
| 5,740,784 | 4/1998 | McKinney | 123/109 |

FOREIGN PATENT DOCUMENTS

| | | | |
|---|---|---|---|
| 4242756 | 6/1994 | Germany | 123/497 |

*Primary Examiner*—Carl S. Miller
*Attorney, Agent, or Firm*—Reising, Ethington, Barnes, Kisselle, Learman & McCulloch, P.C.

[57] ABSTRACT

A fuel system for a fuel injected internal combustion engine has a liquid-cooled fuel pump which draws fuel from a liquid-vapor separator and delivers it under pressure to the engine at a rate higher than that necessary to operate the engine. Preferably, a fuel pressure regulator downstream of the fuel pump and adjacent the engine bypasses excess fuel to a return fuel chamber in communication with the liquid-cooled fuel pump to cool the return fuel before it is returned to the liquid-vapor separator. Reducing the temperature of the returned fuel before it is discharged into the liquid-vapor separator reduces the generation of vapor in the liquid-vapor separator thereby enabling use of a smaller, less expensive vapor separator. Reducing the amount of fuel vapor in the system is desirable because the fuel vapor can decrease the efficiency and life of the fuel pump and is environmentally hazardous.

33 Claims, 3 Drawing Sheets

LIQUID-COOLED IN-LINE FUEL PUMP

FIELD OF THE INVENTION

This invention relates generally to a fuel system and more particularly to a fuel system for a fuel injected internal combustion engine for marine applications.

BACKGROUND OF THE INVENTION

A typical fuel system has a fuel pump which delivers fuel at a rate higher than that required for the operation of the engine. Excess fuel downstream of the fuel pump is bypassed usually by a fuel pressure regulator of some sort, and returned to a fuel reservoir upstream of the fuel pump such as the main fuel tank or a reservoir defined within a fuel pump module or a reservoir defined by a liquid-vapor separator. In some applications a fuel pressure regulator is disposed immediately downstream of the fuel pump to bypass the excess fuel delivered by the fuel pump. In other applications, the fuel pressure regulator is located adjacent the fuel rail on the engine to bypass excess fuel at the fuel rail. In these latter systems, because the fuel is routed closely to the engine before being bypassed, it becomes heated and when returned to a reservoir within the fuel system, this heated return fuel generates fuel vapor within the fuel system which is volatile and hazardous to the environment, detrimental to engine operation and which also decreases the efficiency and life of the fuel pump in use.

U.S. Pat. No. 5,309,885 discloses a marine engine fuel system which routes return fuel to a liquid-vapor separator which is in heat exchange relationship with a cooling chamber through which cold water is circulated to absorb some of the heat from the contents of the liquid-vapor separator, to thereby reduce the amount of vapor therein. However, especially at idle conditions, when an increased amount of fuel is being bypassed and the return fuel is not cooled until after it is discharged into the separator and its pressure is reduced, increased vapor generation occurs requiring an increased volume and hence increased size of the liquid-vapor separator and the water cooling chamber.

SUMMARY OF THE INVENTION

A fuel system for a fuel injected internal combustion engine has an electric fuel pump with a return fuel chamber both of which are liquid-cooled. The liquid-cooled fuel pump draws fuel from a liquid-vapor separator and delivers it under pressure to the engine at a rate higher than that necessary to operate the engine, and a fuel pressure regulator downstream of the engine or fuel pump bypasses excess fuel to the liquid-cooled return fuel chamber to cool the return fuel before it is discharged into the liquid-vapor separator. Preferably, the pressure regulator is downstream of the liquid-cooled return fuel chamber so that return fuel is cooled before its pressure is reduced for discharge into the liquid-vapor separator although the pressure regulator may be adjacent to a fuel rail adjacent the engine.

Preferably, the fuel pump has a housing which defines a return fuel chamber in heat exchange relationship with a cooling chamber through which a fluid, such as water for marine applications, or an engine coolant in other applications is routed to reduce the temperature of both the fuel pump and of the return fuel in the return fuel chamber. The electric fuel pump and engine add most of the heat to the fuel system. Thus, cooling the fuel pump and the return fuel, which was routed adjacent the engine and thereby heated, strategically cools the fuel in the system to reduce the generation of volatile fuel vapors.

Objects, features and advantages of this invention include providing an engine fuel system which virtually eliminates fuel vapor being supplied to the engine, cools fuel returned from the engine before discharging that fuel into a liquid-vapor separator or other fuel reservoir to greatly reduce the generation of hazardous fuel vapor caused by the returned fuel, utilizes a common cooling chamber to cool both the fuel pump and the return fuel, enables use of a smaller and less expensive liquid-vapor separator, improves the efficiency of the fuel pump and extends its life by reducing the vapor drawn into the fuel pump, is readily adaptable to a wide variety of applications, is of relatively simple design and economic manufacture and assembly, and in service, has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
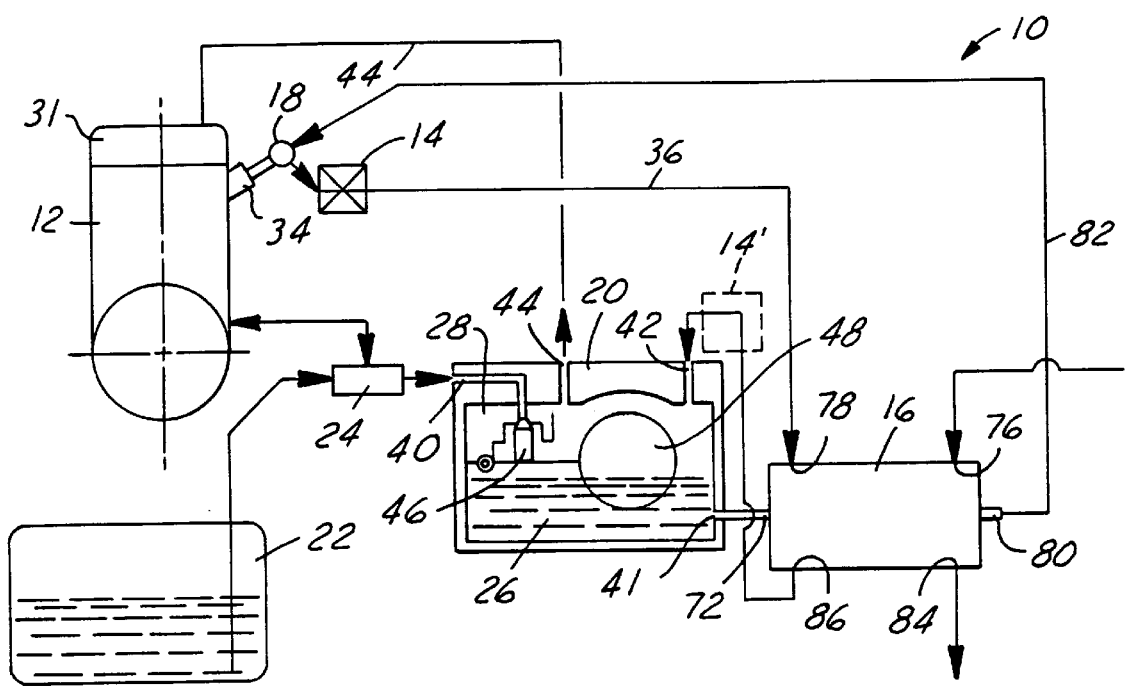
FIG. 1 is a diagrammatic view of a fuel system embodying this invention.

Referring in more detail to the drawings, FIG. 1 shows a return type fuel system 10 for an internal combustion marine engine 12 which has a liquid-cooled electric fuel pump module 16 supplying fuel to a fuel rail 18 of the engine 12 and a fuel pressure regulator 14 disposed downstream of the fuel rail. The pressure regulator 14 bypasses excess fuel delivered to the engine 12 and returns it through a heat exchanger in the liquid-cooled fuel pump module 16 before the return fuel is discharged into a liquid-vapor separator 20. Passing the return fuel through the heat exchanger in the liquid-cooled in-line pump 16 reduces the temperature of the returned fuel to greatly reduce the generation of hazardous hydrocarbon fuel vapors when the returned fuel is discharged into the liquid-vapor separator 20. This reduces the amount of hazardous fuel vapor within the system 10, avoids fuel vapor being delivered to the engine fuel injectors and also permits use of a smaller, less expensive vapor separator 20. Further, the system 10 also provides liquid cooling of the fuel pump 16 which reduces the heat transfer from its electric motor to the fuel as it passes through the fuel pump 16 and thereby reduces the tendency of the fuel to vaporize.

A fuel tank 22 holds a supply of fuel which is moved from the fuel tank 22 to the vapor separator 20 by a low pressure lift pump 24 disposed between them. Typically the lift pump 24 is a diaphragm type pump pneumatically actuated by the pressure fluctuations in the engine crankcase. The liquid-vapor separator 20 defines a reservoir 26 which contains a supply of liquid fuel and a well defined vapor dome 28. The liquid-cooled fuel pump 16 has an inlet 30 through which liquid fuel is drawn from the liquid-vapor separator 20 and an outlet 32 through which fuel is discharged under pressure to the fuel rail 18 and associated fuel injectors 34 to supply fuel to the operating engine 12.

The fuel pressure regulator 14 downstream of the fuel rail 18 preferably provides fuel to the engine 12 over a wide range of flow rates which is at an essentially constant pressure relative to the atmosphere or, if manifold referenced, relative to the differential pressure across the injectors 34. The regulator 14 maintains this constant pressure by bypassing excess fuel through a return fuel line 36. In some applications it may be desirable to place the fuel pressure regulator 14 downstream of the liquid cooled fuel pump 16 (as shown in phantom at 14' in FIG. 1) so that return fuel passes through the liquid-cooled fuel pump 16 before its pressure is reduced by the pressure regulator and it is discharged into the liquid-vapor separator 20. Preferably, the fuel pressure regulator 14 is a "bypass" type regulator such as disclosed in U.S. Pat. No. 5,579,739, the disclosure of which is incorporated herein by reference and hence, the construction of the fuel pressure regulator 14 will not be described in further detail.

The liquid-vapor separator 20 has a fuel inlet 40 through which fuel discharged from the lift pump 24 is received into the separator 20, an outlet 41 in communication with the fuel pump inlet 30, a return fuel inlet 42 through which returned fuel is discharged into the separator 20 and a vent 44 in communication with the vapor dome 28 through which fuel vapor within the separator 20 is communicated with an air intake manifold 31 of the engine 12 to be consumed by the operating engine 12. The liquid-vapor separator fuel inlet 40 is selectively opened and closed by an inlet valve 46 operably connected to a float 48 within the reservoir 26. The float 48 is responsive to the fuel level within the reservoir 26 of the liquid-vapor separator 20 and moves the inlet valve 46 to close the fuel inlet 40 when the fuel rises to a predetermined level in the reservoir 26. This prevents completely filling the reservoir 26 with fuel from the fuel tank 22 to maintain the vapor dome 28 and permit the returned fuel to be received therein. Especially under engine idle conditions, when a majority of the fuel delivered to the fuel rail 18 is returned to the liquid-vapor separator 20, the reservoir 26 may contain a substantial portion of returned fuel as compared to fuel being supplied from the fuel tank 22.

It is preferable to use the returned fuel because its more volatile components, which tend to more readily vaporize, will have been already removed from the return fuel due to it being subjected to changes in pressure and temperature when initially traveling through the fuel system. Therefore, the return fuel has a reduced vapor content and is less likely to vaporize than "fresh" fuel from the fuel tank 22. Further, it is also preferable to use the returned fuel because it has already been filtered at least once when previously drawn through the fuel pump 16 and will be filtered again upon being drawn into the fuel pump 16 when it is recirculated for use.

The fuel pump 16 has a fuel pump mechanism 47 driven by an electric motor 49 both of which are received in an enclosed housing with an outer shell 56. Fuel discharged from the pump flows within the shell 56 around the electric motor to cool it and through the housing outlet. The electric fuel pump 16 may be substantially of any type such as a positive displacement fuel pump as disclosed in U.S. Pat. No. 5,265,997 or a turbine vane fuel pump such as disclosed in U.S. Pat. No. 5,586,858, the disclosures of which are incorporated herein by reference and hence, the internal structure of the fuel pump mechanism 47 and motor 49 will not be described in further detail. In use the fuel pump 16 preferably supplies fuel at a substantially constant flow rate capable of supplying more than the total fuel demand of the engine 12 even at maximum engine load and fuel demand conditions.

Figure 2:
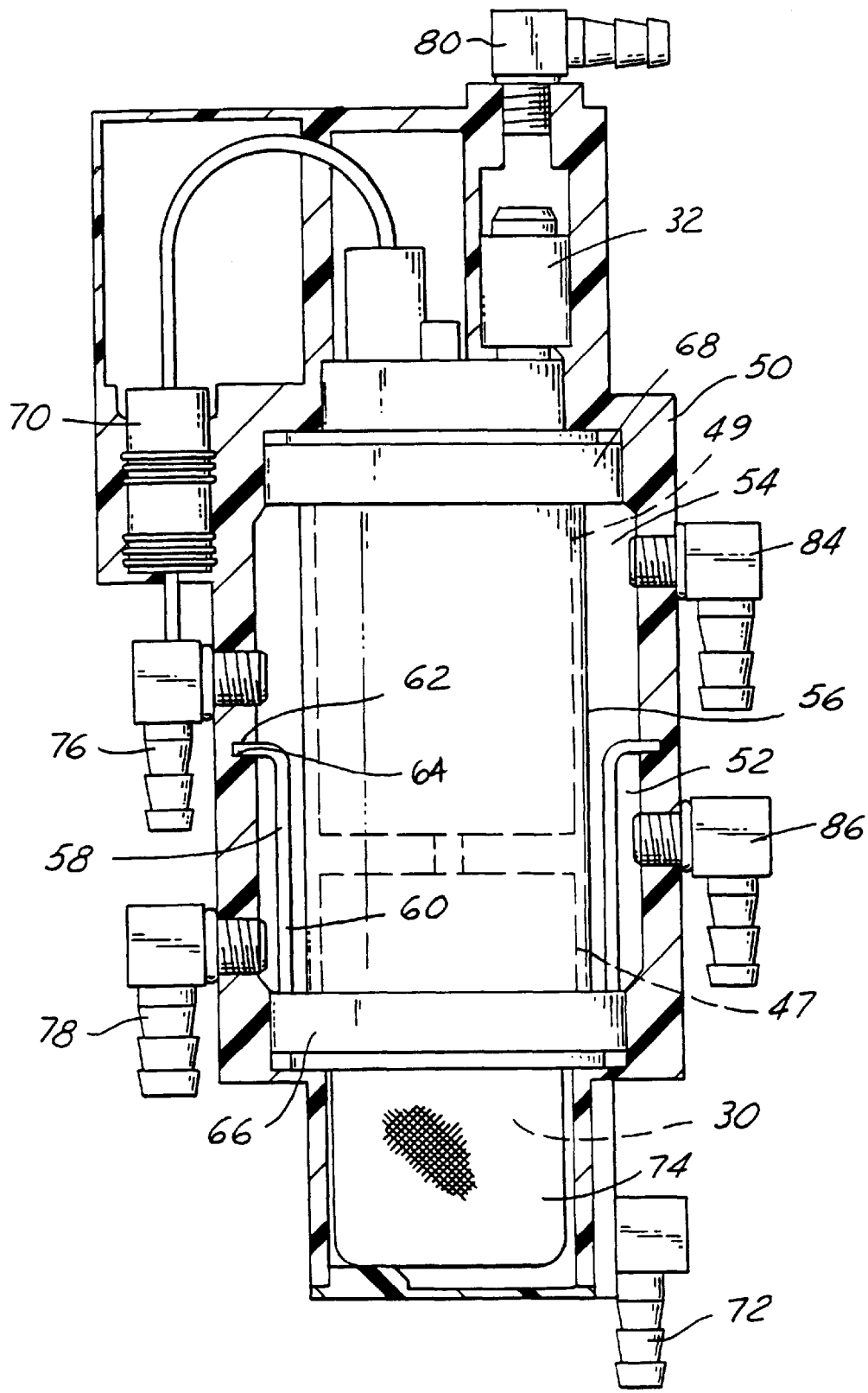
FIG. 2 is a sectional view illustrating a fuel pump embodying this invention.

As shown in FIG. 2, the fuel pump 16 is received in a housing 50 which defines in part a return fuel chamber 52 and a cooling fluid chamber 54 adjacent thereto. The fuel pump 16 is preferably enclosed in a cylindrical shell 56 to isolate it from the fluid within the cooling fluid chamber 54 circumferentially surrounding the shell 56 and defined in part between the shell 56 and housing 50. The shell 56 is preferably formed of a material with high thermal conductivity such as steel or copper and is in direct contact with the cooling fluid chamber 54 for a good heat transfer therewith.

Figure 3:
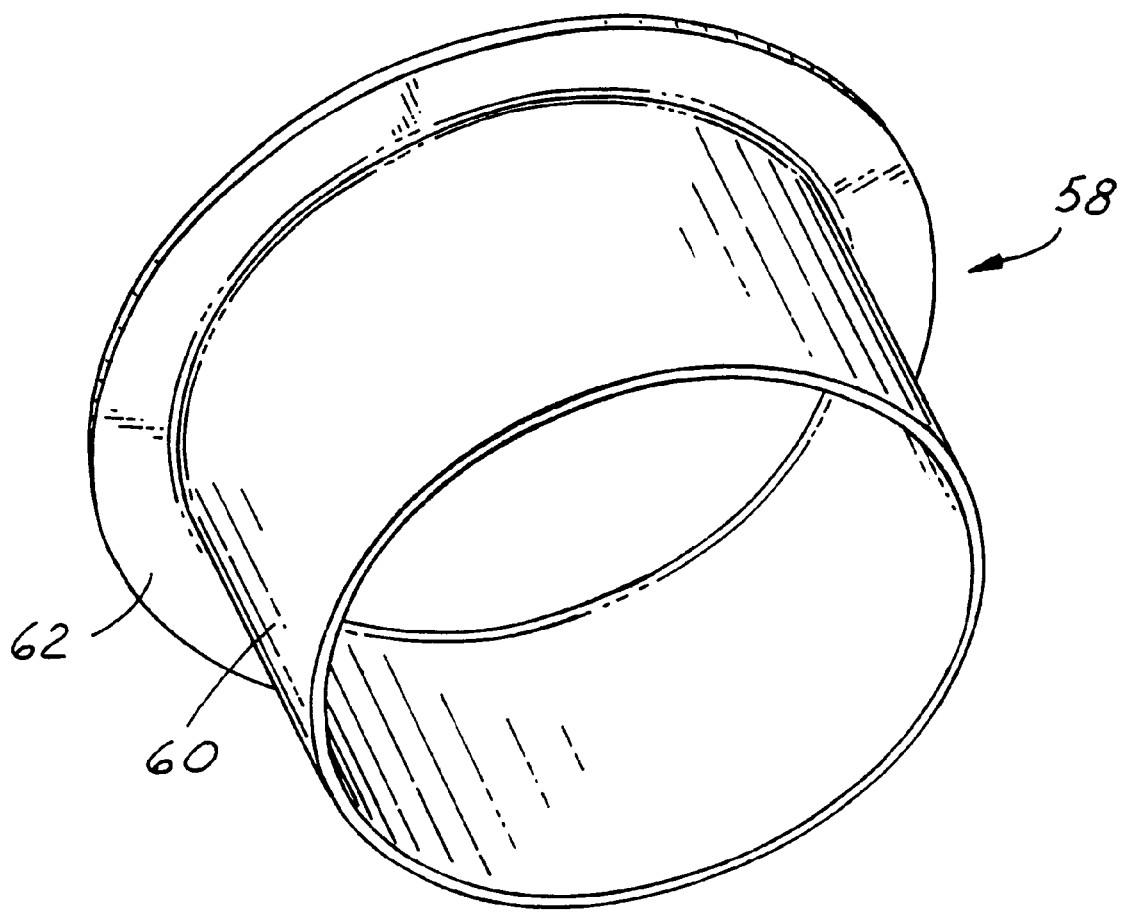
FIG. 3 is a perspective view of a return fuel isolator carried by the housing of the fuel pump.

An annular, cylindrical return fuel isolator 58, as shown in FIG. 3, has an axially extending sidewall 60 and a radially outwardly extending flange 62 which as shown in FIG. 2 in assembly is circumferentially received in a groove 64 formed in the housing 50 at one end and has its other end received in a circumferentially continuous elastomeric seal 66 which isolates and seals the fuel pump inlet 30 from the return fuel chamber 52 and cooling fluid chamber 54 to prevent leakage between them. To provide a heat exchanger with good heat transfer from fuel in the chamber 52 to fluid in the chamber 54, the return fuel isolator 58 is preferably formed of a material having high thermal conductivity, such as steel or copper, to readily transfer heat therethrough. The axially extending sidewall 60 increases the surface area of the return fuel chamber 52 adjacent the cooling fluid chamber 54 to increase heat transfer between them. Thus, as shown, the return fuel chamber 52 is defined between the return fuel isolator 58, the housing 50, and the elastomeric seal 66.

A second circumferentially continuous elastomeric ring 68 provides a seal adjacent the opposite end of the fuel pump shell 56 isolating electrical connectors 70 of the fuel pump motor as well as the fuel pump outlet 32 from the cooling fluid chamber 54. The cooling fluid chamber 54 surrounds the fuel pump shell 56 and is defined by the pump elastomeric seals 66 and 68, shell 56, return fuel isolator 58, and the housing 50.

The outer housing 50 has a fuel inlet 72 in communication with the outlet 41 of the liquid-vapor separator 20 through which fuel is drawn into the fuel pump 16 preferably through a cup shaped filter 74 which encloses the fuel pump inlet 30. A coolant inlet 76 in the housing 50 communicates a cooling fluid source, such as a jet propulsion water pump or an engine water pump in a marine application with the cooling fluid chamber 54. A return fuel inlet 78 in the housing 50 communicates with the return fuel chamber 52 to supply return fuel from the line 36. A fuel outlet 80 in the housing 50 communicates the fuel pump outlet 32 with a fuel line 82 to deliver fuel under pressure to the fuel rail 18. A coolant outlet 84 in the housing 50 communicates the cooling fluid chamber 54 with the exterior of the housing 50 to discharge cooling fluid from the chamber 54. A return fuel outlet 86 in the housing 50 communicates the returned fuel in the return fuel chamber 52 with a conduit 88 through which the returned fuel is discharged into the liquid-vapor separator 20 through its return fuel inlet 42.

In use, when the inlet valve 46 of the liquid-vapor separator 20 is open, i.e., the fuel level in the reservoir 26 is below a predetermined level, the low pressure lift pump 24 draws fuel from the fuel tank 22 and discharges it through the fuel inlet 40 into the liquid-vapor separator 20. The fuel pump module 16 draws fuel from the liquid-vapor separator 20 and discharges that fuel under pressure through the fuel line 82 to the fuel rail 18 on the engine 12 to supply fuel to the injectors 34 of the engine. The fuel pressure regulator 14 downstream of the fuel rail 18 bypasses excess fuel through the return fuel line 36 and into the return fuel chamber 52 of the fuel pump assembly housing 50 where it is cooled by a coolant such as cold water pumped or forced through the chamber 54 in heat transfer relationship with the returned fuel and with the fuel pump 16 to cool both of them. The returned and cooled fuel is discharged from the chamber 52 through the return fuel outlet 86 and into the liquid-vapor separator 20 through its return fuel inlet 42. The cooled return fuel will not generate as much vapor within the liquid-vapor separator 20 as would uncooled returned fuel.

Figure 4:
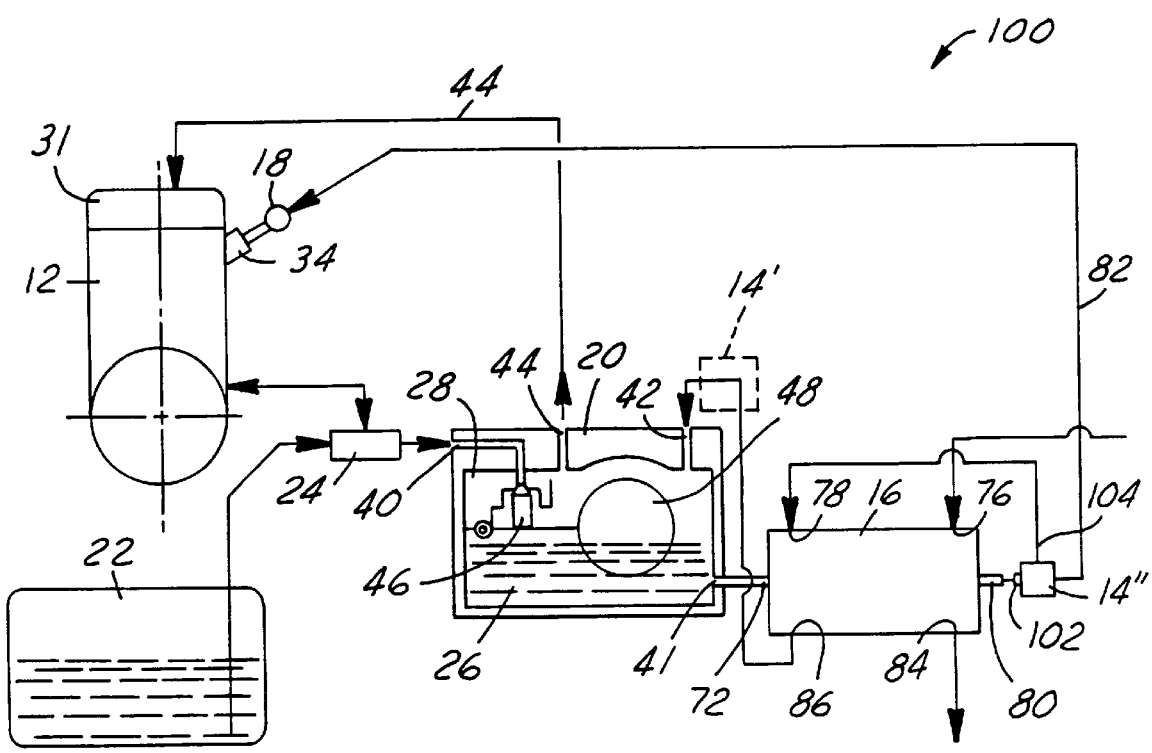
FIG. 4 is a diagrammatic view of another fuel system embodying this invention and having a fuel pressure regulator immediately downstream of the fuel pump.

As shown in FIG. 4, a no-return fuel system 100 may also be utilized embodying the present invention. In this fuel system 100, a fuel pressure regulator 14" is disposed immediately downstream of the fuel pump outlet 80 to bypass excess fuel delivered from the fuel pump 16 and deliver fuel to the engine 12 corresponding to the engine's fuel demand. The regulator 14' has an inlet 102 in communication with the outlet 80 and a bypass outlet 104 in communication with the return fuel inlet 78 to route the bypassed fuel into the return fuel chamber 52 to be returned to the liquid-vapor separator 20. The rest of the fuel system 100 is constructed and operates in the same manner as the fuel system 10 and hence, will not be described further.

Thus, with this fuel system 10 an existing cooling fluid pressure source such as an engine driven water pump, jet propulsion pump or engine coolant pump, supplies a cooling fluid such as cold water that both cools the electric fuel pump 16 and the hot return fuel. This strategically cools the fuel in the system 10 immediately after the fuel is significantly heated at each of two points in the system; namely, as it passes through the fuel pump 16 and as it passes through the fuel rail 18 of the operating engine 12 and before the fuel is discharged into the vapor separator. Thus, cooling the electric fuel pump 16 and cooling the return fuel which has passed through the engine fuel rail is an effective method of cooling the fuel in the system 10 to thereby limit the generation of vapor in the fuel system 10. Reducing the fuel vapor generated within the system 10 reduces the hazardous hydrocarbon vapors emitted from the system 10, avoids fuel vapor being supplied to the engine, increases the life of the fuel pump module 16 and its efficiency, and enables use of a smaller, less expensive liquid-vapor separator 20.

We claim:

1. A fuel system comprising:
   a fuel pump housing;
   an electric motor fuel pump received within the housing;
   a fluid chamber defined in part by the housing and constructed to receive a coolant fluid in heat exchange relationship with the electric motor of the fuel pump;
   a first inlet in the housing through which fuel is drawn into the fuel pump;
   a first outlet in the housing through which fuel is discharged under pressure from the fuel pump;
   a second inlet in the housing in communication with the fluid chamber; and
   a second outlet in the housing through which coolant fluid received in the fluid chamber may be discharged from the housing whereby the coolant fluid within the fluid chamber is in heat exchange relationship with the fuel pump to cool the fuel pump; and
   a return fuel heat exchanger including a return fuel inlet and a return fuel outlet configured to respectively receive fuel into and discharge fuel from a return fuel chamber configured to pass the fuel in heat exchange relationship with the coolant fluid while isolating the fuel from the coolant fluid.

2. The fuel system of claim 1 which also comprises a fuel pump shell enclosing the fuel pump and isolating it from fluid in the fluid chamber and defining in part the fluid chamber.

3. The fuel system of claim 2 wherein the fluid chamber is defined in part between the exterior surface of the fuel pump shell and the housing and substantially circumferentially encloses at least a portion of the fuel pump shell.

4. The fuel system of claim 2 wherein the fuel pump shell is formed of a material having high thermal conductivity.

5. The fuel system of claim 4 wherein the fuel pump shell is formed of metal.

6. A fuel pump comprising:
   a housing;
   an electric motor fuel pump received within the housing;
   a fluid chamber defined in part by the housing and constructed to receive a fluid in heat exchange relationship with the electric motor of the fuel pump;
   a first inlet in the housing through which fuel is drawn into the fuel pump;
   a first outlet in the housing through which fuel is discharged under pressure from the fuel pump;
   a second inlet in the housing in communication with the fluid chamber;
   a second outlet in the housing through which fluid received in the fluid chamber may be discharged from the housing whereby the fluid within the fluid chamber is in heat exchange relationship with the fuel pump to cool the fuel pump;
   a return fuel isolator carried by the housing and defining in part a return fuel chamber isolated from fluid in the fluid chamber;
   a return fuel inlet in the housing constructed to receive fuel into the return fuel chamber; and
   a return fuel outlet through which fuel in the return fuel chamber is discharged from the housing.

7. The fuel pump of claim 6 wherein the return fuel isolator has a generally cylindrical and axially extending sidewall which defines in part the fluid chamber along one surface of the sidewall and defines in part the return fuel chamber along the other surface of the sidewall so that the fluid chamber is in heat exchange relationship with the return fuel chamber to cool the fuel in the return fuel chamber.

8. The fuel system of claim 5 wherein the return fuel isolator is formed of a material with high thermal conductivity.

9. The fuel pump of claim 6 wherein the return fuel chamber is defined between the return fuel isolator and the housing.

10. The fuel pump of claim 6 wherein the return fuel isolator is formed of a material with high thermal conductivity.

11. The fuel pump of claim 10 wherein the return fuel isolator is formed of metal.

12. A fuel system for a fuel injected internal combustion engine comprising:
   a fuel line through which fuel is delivered to the fuel injectors of the engine;
   a fuel pump assembly housing;
   an electric motor fuel pump received within the housing;
   a return fuel line into which excess fuel delivered from the fuel pump is bypassed;
   a return fuel chamber defined at least in part by the housing and constructed to receive fuel from the return fuel line;

a fluid chamber defined in part by the housing, isolated from fuel in the return fuel chamber and constructed to receive a fluid in heat exchange relationship with the fuel pump and with fuel in the return fuel chamber;

a first inlet in the housing through which fuel is drawn into the fuel pump;

a first outlet in the housing through which fuel is discharged under pressure from the fuel pump to the fuel line;

a second inlet in the housing in communication with the fluid chamber;

a second outlet in the housing through which the fluid received in the fluid chamber may be discharged from the housing;

a third inlet in the housing communicating the return fuel line with the return fuel chamber; and a third outlet in the housing through which return fuel in the return fuel chamber may be discharged from the housing whereby cooling fluid within the fluid chamber is in heat exchange relationship with the fuel pump and the return fuel in the return fuel chamber to cool the return fuel and the electric motor of the fuel pump.

13. The fuel system of claim 12 which also comprises a fuel pump shell enclosing the electric motor fuel pump and defining in part the fluid chamber.

14. The fuel system of claim 13 wherein the fluid chamber is defined in part between the exterior surface of the fuel pump shell and the housing and substantially circumferentially encloses at least a portion of the fuel pump shell.

15. The fuel system of claim 12 which also comprises a return fuel isolator carried by the housing and separating fuel in the return chamber from cooling fluid in the fluid chamber.

16. The fuel system of claim 15 wherein the return fuel isolator has a generally cylindrical and axially extending sidewall which defines in part the fluid chamber along one surface of the sidewall and defines in part the return fuel chamber along the other surface of the sidewall.

17. The fuel system of claim 15 wherein the return fuel isolator is formed of a material with high thermal conductivity.

18. The fuel system of claim 16 wherein the return fuel isolator is formed of a material with high thermal conductivity.

19. The fuel system of claim 17 wherein the return fuel isolator is formed of metal.

20. The fuel system of claim 15 wherein the return fuel chamber is defined between the return fuel isolator and the housing.

21. The fuel system of claim 18 wherein the fluid chamber is defined by the fuel pump shell, the return fuel isolator and the housing.

22. The fuel system of claim 21 wherein the fluid chamber encloses substantially the entire axial length of the fuel pump shell.

23. The fuel system of claim 21 wherein the fluid chamber extends adjacent the return fuel isolator along substantially the entire axial length of the return fuel chamber.

24. The fuel system of claim 12 which also comprises a fuel pressure regulator downstream of the fuel pump and having a bypass outlet, in communication with the third inlet of the fuel pump assembly housing, through which excess fuel delivered from the fuel pump is diverted to the third inlet.

25. The fuel system of claim 12 which also comprises a liquid-vapor separator upstream of the fuel pump and defining a reservoir in communication with the third outlet to receive the cooled return fuel discharged from the return fuel chamber.

26. The fuel system of claim 25 wherein the liquid-vapor separator has an outlet in communication with the first inlet to supply fuel to the fuel pump.

27. The fuel system of claim 25 which also comprises a low pressure fuel pump with an inlet to draw fuel from the fuel tank and an outlet to deliver fuel to the vapor separator.

28. The fuel system of claim 27 which also comprises an inlet in the liquid-vapor separator in communication with the low pressure fuel pump and a float valve, responsive to the fuel level in the reservoir and operable to close the liquid-vapor separator inlet to prevent the reservoir from being completely filled with fuel from the low pressure fuel pump thereby providing a non-liquid filled portion of the reservoir into which fuel vapor may be released.

29. The fuel system of claim 12 wherein the fluid received in the second inlet is water.

30. The fuel system of claim 12 wherein the fluid received in the second inlet is a liquid engine coolant.

31. The fuel system of claim 12 which also comprises a fuel pressure regulator downstream of the return fuel chamber and having an inlet in communication with the third outlet in the housing and a bypass outlet downstream of the return fuel chamber.

32. The fuel system of claim 31 which also comprises a liquid-vapor separator upstream of the fuel pump and defining a reservoir in communication with the bypass-outlet of the pressure regulator.

33. The fuel system of claim 12 which also comprises a fuel pressure regulator downstream of the engine and having a bypass outlet in communication with the return fuel line and through which excess fuel delivered to the engine and not consumed by the engine is returned through the return fuel line.

* * * * *